May 20, 1952  I. J. GRUENBERG ET AL  2,597,241
SPRAG FOR ONE-WAY CLUTCHES

Filed Feb. 2, 1948  2 SHEETS—SHEET 1

*INVENTORS*
IVOR J. GRUENBERG
BY  LEOPOLD T. SZADY

ATTORNEYS

May 20, 1952 — I. J. GRUENBERG ET AL — 2,597,241
SPRAG FOR ONE-WAY CLUTCHES
Filed Feb. 2, 1948 — 2 SHEETS—SHEET 2

INVENTORS
IVOR J. GRUENBERG
LEOPOLD T. SZADY
BY Whittemore Hulbert & Belknap
ATTORNEYS Patented May 20, 1952

2,597,241

UNITED STATES PATENT OFFICE 2,597,241

SPRAG FOR ONE-WAY CLUTCHES

Ivor J. Gruenberg, Pleasant Ridge, and Leopold T. Szady, Detroit, Mich., assignors to Formsprag Company, Ferndale, Mich., a corporation of Michigan Application February 2, 1948, Serial No. 5,774

1 Claim. (Cl. 192—45.1)

The invention relates to one-way clutches of that type in which driving force is transmitted from one member to another through the medium of sprags interposed between parallel surfaces on the respective members. More particularly, the invention relates to one-way rotary clutches having spaced concentric cylindrical surfaces, on the driving and driven members with a series of sprags interposed therebetween.

It is the primary object of the invention to obtain a construction of sprag which, when used in a clutch, is most efficient in its operation and which does not require too close tolerance limits in the manufacture of the cooperating clutch elements with which it is associated.

It is a further object to obtain a construction of universal sprag which is equally applicable to one-way rotary clutches differing from each other in radial dimensions and the number of sprags used in each.

With these objects in view the invention consists, first in a construction of sprag having a cammed end surface so fashioned that when used in a clutch the action angle remains substantially constant for a predetermined portion of said cammed surface and progressively increases in a succeeding portion thereof. The invention further consists in a construction of sprag having substantially like opposite end cammed surfaces such that when used in a clutch the action angle has slight variance for a predetermined rotation of the sprag about its own axis with a progressively increasing action angle during further rotation thereof. Still further the invention consists in the more specific construction of the sprag as hereinafter set forth.

Figure 2:
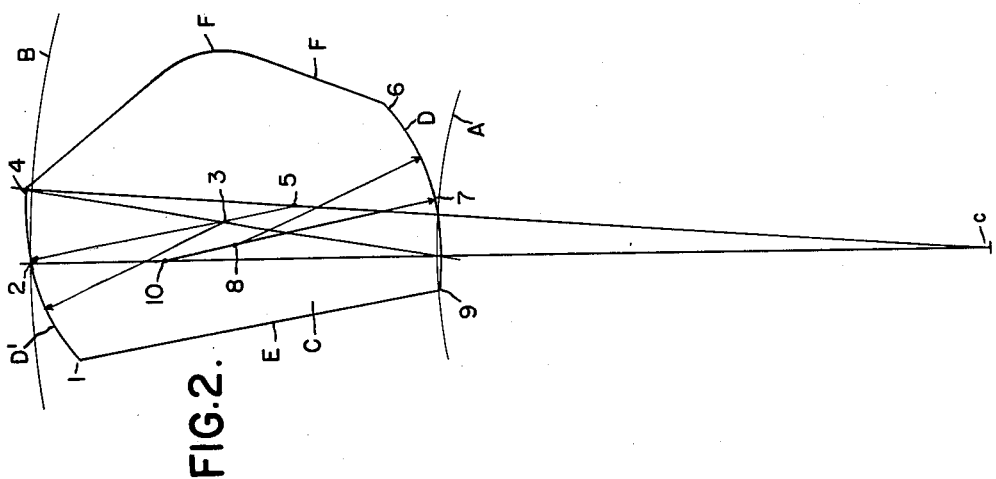
Fig. 2 is a similar view showing a third position in which the action angle is increased.

As the general construction of one-way rotary clutches to which our invention is applicable is well-known, we have merely illustrated concentric circles A and B representing, respectively, the spaced inner and outer surfaces of the clutch members between which torque is to be transmitted in one direction of rotation of the driving member. C is one of the sprags interposed between said surfaces having cammed radially inner and outer ends D and D', a straight side E extending between said ends and a V-shaped opposite side F having a central rounded nose F' for bearing against an adjacent sprag. Such construction can be used to substantially fill the entire annular space between the inner and outer concentric surfaces of the clutch members, and, because of the V-shaped side, clearance is provided for use in clutches of relatively small radial dimensions and with relatively few sprags in the series. Also the fact that the straight side of one sprag is adjacent to the nose F' of another sprag prevents the catching of one on the other during rocking movement in or out of clutching engagement.

The cam surfaces D and D' can roll in contact with the concentric surfaces A and B during clutching and de-clutching action, and the relative dimensions are such that during initial contact there will be a predetermined action angle between the points of bearing $a$ and $b$ on the respective surfaces. In other words, in the direction of rotation of the driving surface, the point of contact of the cam thereon will be in rear of the point of contact of the cam on the driven surface, and the line $a$—$b$ connecting these points will be at a predetermined angle to a radial line $c$—$d$ from the center $c$ of the clutch passing through the driving point $a$. This constitutes the action angle. If, however, there are inaccuracies in the manufacture of the clutch so that the space between the circles A and B is larger or smaller, this will change the points of bearing of the cam surfaces upon their respective concentric surfaces. The amount of rotation of each sprag to compensate for such errors depends upon the design of the cam surfaces. It is possible to so design it that there will be no change in action angle with variation in the dimension between the concentric surfaces. This, however, is not desirable for with increase in torque load the action angle will be diminished due to deformation of the clutch members. In other words, the clutch tends to wind up, the driving member advancing faster than the driven member until the limit of distortion is reached, thus reducing the action angle. On the other hand, the cam may be so designed as to compensate for this deformation and to either maintain the action angle constant or to increase it. The latter would be a desirable construction if the spacing between the concentric surfaces were always the same, but with variations in such spacing the action angle of initial contact would be correspondingly increased or diminished. It is, therefore, apparent that a cam designed for best action after initial contact will require closer tolerances in the manufacture of the cooperating clutch members. On the other hand, a cam that maintains a constant action angle throughout the whole extent of its rolling surface is not as good for transmission of heavy torque.

In view of the conditions just described, we have designed a sprag having a cammed end surface with a portion of the rolling surface thereof maintaining a substantially constant action angle and a further portion of the rolling surface which has a progressively increasing action angle. The constant action angle portion is of sufficient extent to compensate for variations in the spacing of the concentric surfaces, while the succeeding portion will compensate for deformation of the clutch members under increased torque load and to at all times maintain a sufficiently large action angle. The following table shows the variation in action angle for different degrees of rotation of the sprag in three different designs of cam, the design represented in column III being the desired construction.

| Degrees Rotation of Sprag | Angle of Action | | |
|---|---|---|---|
| | Sprag I | Sprag II | Sprag III |
| | Degrees | Degrees | Degrees |
| 0 | 4 | 4 | 4 |
| 5 | 4 | 7½ | 4 |
| 9 | 4 | 10 | 4 |
| 11 | 4 | 10 | 4½ |
| 15 | 4 | 13 | 7 |
| 20 | 4 | Beyond Limit | 10 |

Figure 1:
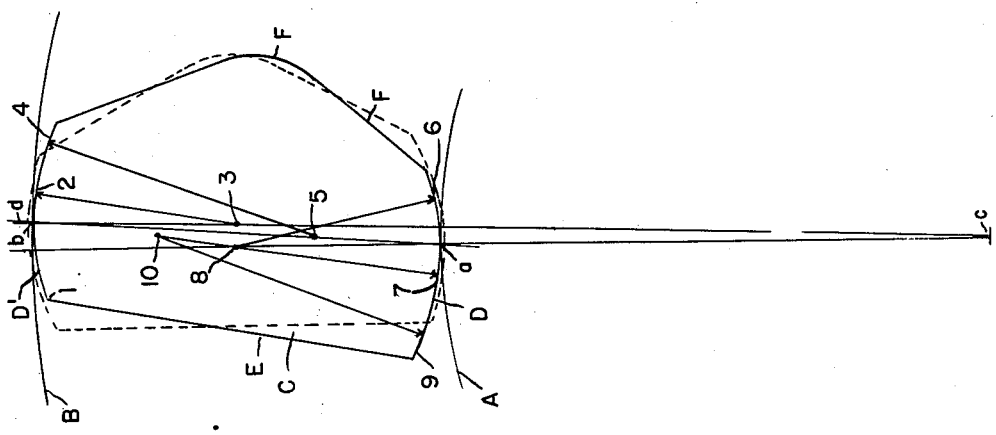
Fig. 1 is an enlarged elevation of our improved construction of sprag showing, respectively, in full and broken lines two positions of rolling contact with concentric race surfaces in each of which positions the action angle remains constant.
Figure 5:
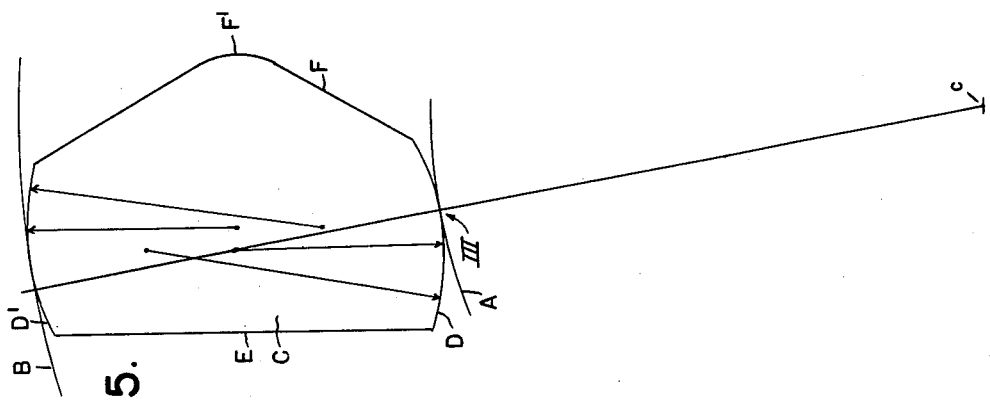
Figs. 3, 4 and 5 are similar views showing a comparison between three types of sprags, also designated in Roman numerals I, II and III, of which III is our improved construction.
Figure 4:
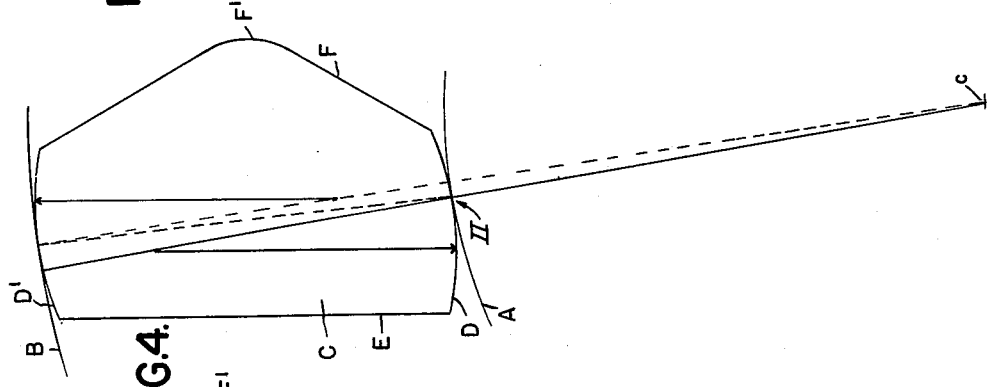
Figure 3:
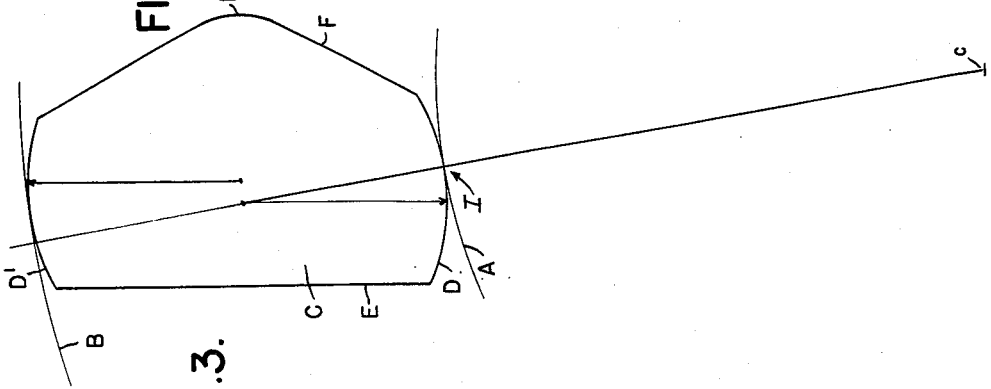

It will be noted that in column I the action angle remains constant at 4° during rotation of the sprag from 0 to 20°. In column II the action angle progressively increases and in 5° of rotation of the sprag it is changed from 4° to 7½°. In column III the action angle remains constant at 4° for 9° of rotation of the sprag and progressively increases to 10° up to 20° of rotation of the sprag. This is the principle of construction of our improved sprag but it is not essential that the figures should be the same as in column III, or that the angle of action should remain absolutely constant for a portion of the rolling surface. It is only necessary that the increase in action angle should be relatively small in the first portion of the rolling surface and that there should not be too great a change between successive points in the remaining portion of the surface. As shown in Fig. 1, each cam surface is formed by tangent arcuate curves of different radii. In the surface D', the portion of the curve between points 1 and 2 is an arc from the center 3 which is midway between the inner and outer ends of the sprag and is therefore of a radius approximately one-half of the average diameter of the sprag. The portion of the cam between points 2 and 4 is an arc having its center at 5, which is below the point 3, so as to have a correspondingly greater radius. The cam D is similar, the portion of the curve between the points 6 and 7 being concentric with the point 8 which is laterally offset from the point 3 but is also midway between the ends of the sprag. The portion of the curve 7 and 9 has its center in a point 10, which is above the point 8, a distance equal to that between the points 3 and 5. This construction corresponds to that of column III of the table. However, as above stated the exact specific form of a curve is non-essential and it need not be formed of arcuate portions.

What we claim as our invention is:

A sprag having cammed surfaces at opposite ends thereof, portions of each of said cammed surfaces being arcs having laterally spaced respective centers located midway between said opposite ends and other portions of said cammed surfaces being arcs of longer radius respectively tangent to the aforesaid arcs.

IVOR J. GRUENBERG.
LEOPOLD T. SZADY.

REFERENCES CITED

The following references are of record in the file of this patent:

UNITED STATES PATENTS

| Number | Name | Date |
|---|---|---|
| 1,542,040 | De Lavaud | June 16, 1925 |
| 2,023,961 | Leichsenring | Dec. 10, 1935 |
| 2,113,722 | Dodge | Apr. 12, 1938 |

FOREIGN PATENTS

| Number | Country | Date |
|---|---|---|
| 637,610 | France | May 4, 1928 |